(12) United States Patent
Mukherjea et al.

(10) Patent No.: US 9,069,848 B2
(45) Date of Patent: Jun. 30, 2015

(54) AUTOMATIC TAXONOMY ENRICHMENT

(75) Inventors: Sougata Mukherjea, New Delhi (IN);
Amit A. Nanavati, New Delhi (IN); L. Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 12/569,117

(22) Filed: Sep. 29, 2009

(65) Prior Publication Data

US 2011/0078158 A1 Mar. 31, 2011

(51) Int. Cl.
*G06F 17/30* (2006.01)
*G06F 17/27* (2006.01)

(52) U.S. Cl.
CPC ...... *G06F 17/30734* (2013.01); *G06F 17/2785* (2013.01); *G06F 17/30737* (2013.01)

(58) Field of Classification Search
USPC .................................. 707/740, 749; 706/12
See application file for complete search history.

(56) References Cited

U.S. PATENT DOCUMENTS

| 6,446,061 | B1 | 9/2002 | Doerre et al. | |
| 6,928,425 | B2 | 8/2005 | Grefenstette et al. | |
| 7,644,052 | B1 * | 1/2010 | Chang et al. | 706/45 |
| 8,423,565 | B2 * | 4/2013 | Redlich et al. | 707/758 |
| 2004/0181544 | A1 * | 9/2004 | Anderson | 707/102 |
| 2007/0005621 | A1 * | 1/2007 | Lesh et al. | 707/101 |
| 2007/0198564 | A1 * | 8/2007 | Blackstone et al. | 707/101 |
| 2008/0071731 | A1 | 3/2008 | Ma et al. | |
| 2008/0091634 | A1 | 4/2008 | Seeman | |
| 2008/0189265 | A1 * | 8/2008 | Taranov et al. | 707/5 |
| 2008/0288425 | A1 * | 11/2008 | Posse et al. | 706/12 |
| 2009/0037457 | A1 * | 2/2009 | Musgrove | 707/102 |
| 2010/0094874 | A1 * | 4/2010 | Huber et al. | 707/740 |
| 2010/0161527 | A1 * | 6/2010 | Sellamanickam et al. | 706/12 |
| 2013/0060785 | A1 * | 3/2013 | Sweeney et al. | 707/748 |

OTHER PUBLICATIONS

Wang et al., Automatic Feature Thesaurus Enrichment—Extracting Generic Terms from Digital Gazetteer, JCDL'06, Jun. 11-15, 2006, Chapel Hill, North Carolina, pp. 326-333.
Makrehchi et al., Automatic Taxonomy Extraction Using Google and Term Dependency, 2007 IEEE/WIC/ACM International Conference on Web Intelligence, pp. 321-325.
Diouf et al., Methodological Aspects of Semantics Enrichment in Model Driven Architecture, The Third International Conference on Internet and Web Applications and Services, 2008 IEEE, pp. 205-210.
Venkata et al., Enriching One Taxonomy Using Another, IEEE Transactions on Knowledge and Data Engineering, vol. 6, No. 1, Jan. 2007, pp. 1-14.

* cited by examiner

*Primary Examiner* — Sherief Badawi
*Assistant Examiner* — Christopher J Raab
(74) *Attorney, Agent, or Firm* — Ryan, Mason & Lewis, LLP

(57) ABSTRACT

Techniques for enriching a taxonomy using one or more additional taxonomies are provided. The techniques include receiving two or more taxonomies, wherein the two or more taxonomies comprise a destination taxonomy and one or more additional taxonomies, determining one or more relevant portions of the two or more taxonomies by identifying one or more common terms between the two or more taxonomies, importing one or more relevant portions from the one or more additional taxonomies into the destination taxonomy, and using the one or more imported taxonomy portions to enrich the destination taxonomy.

10 Claims, 6 Drawing Sheets

FIG. 1

```
                                                                    ┌─ 102
merge-into (T_src, T_dest, D)
(1)   Identify matches between T_src and T_dest using D to create M.
(2)   Sort M such that the lower elements in T_dest appear before the higher ones.
(3)   while (M ≠ ∅)
(4)       Pick the first match m = (u, v) in M.
(5)       If ((sub(u) ∩ cxt(v)) = ∅) { // synonyms included
              // remove nodes processed by subsumed matches
(6)           new(u) := sub(u)
(7)           foreach match (u', v') in M
(8)               if ((u, v) ▷ (u', v'))
(9)                   new(u) := new(u) - sub(u')
              // add remaining nodes
(10)          foreach u_i ∈ new(u)
(11)              add u_i to T_dest.
              // add edges to synonyms
(12)          foreach edge (u_i, u), u_i ∈ new(u)
(13)              add edge (u_i, v) to T_dest.
              // add edges between newly added nodes
(14)          foreach adjacent u_i, u_j ∈ new(u)
(15)              add edge (u_i, u_j) to T_dest.
              // add edges between a new node and a previously added one
(16)          foreach adjacent u_i, u_j (u_i ∈ (new(u) ∪ {u}), u_j ∈ (sub(u) -
              new(u)))
(17)              if (v_k = syn(u_j) ) then add edge (u_i, v_k) to T_dest.
(18)                                  else add edge (u_i, v_ℓ) to T_dest. // v_ℓ = u_j
              }
(19)      Remove m from M.
```

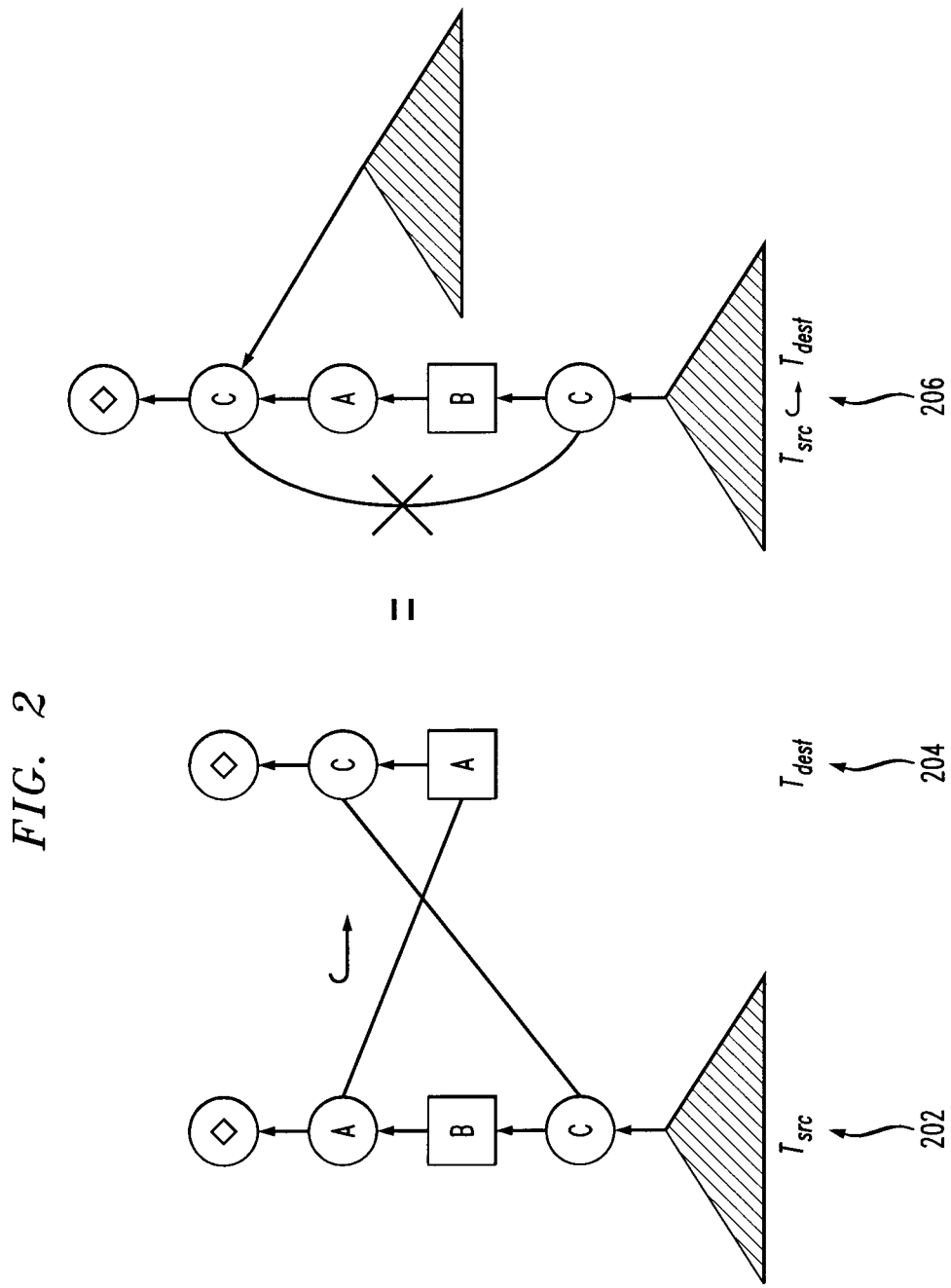

*FIG. 4*
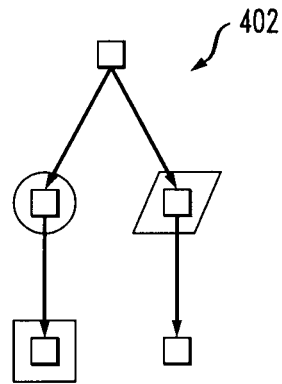
$T_1$
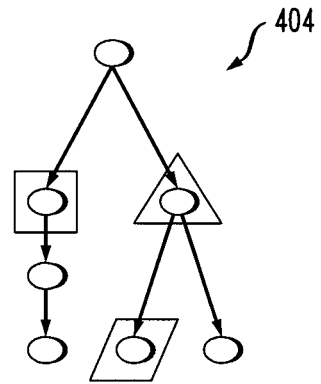
$T_2$
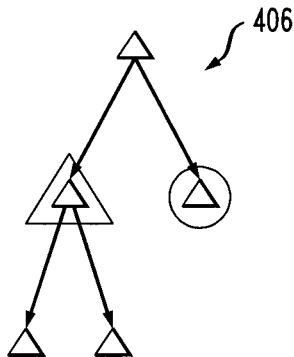
$T_3$
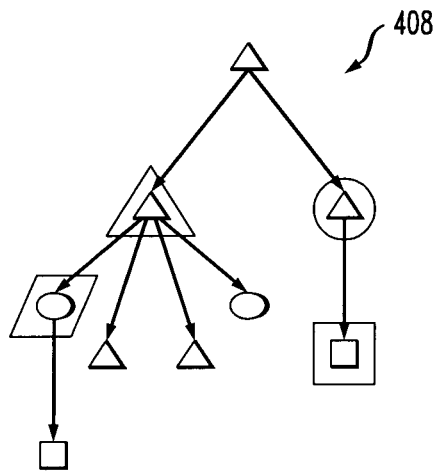
$T_1 \hookrightarrow (T_2 \hookrightarrow T_3)$
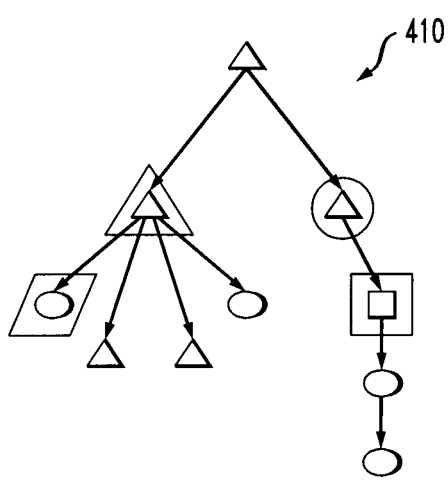
$T_2 \hookrightarrow (T_1 \hookrightarrow T_3)$

```
                                                               ┌─ 502
Input: A set of Taxonomies T = { T₁,..., Tₗ }.
Output: ((T₁,..., Tₗ) ↪ T_dest).
multi-merge(T, T_dest, D)
(1)   changeflag := true
(2)   origdest := T_dest
(3)   while (changeflag = true)
(4)       foreach T_i ∈ T
(5)           merge-into(T_i, T_dest, D)
(6)           if T_dest ≠ origdest then origdest := T_dest
(7)                              else changeflag := false
```

AUTOMATIC TAXONOMY ENRICHMENT

FIELD OF THE INVENTION

Embodiments of the invention generally relate to information technology, and, more particularly, to taxonomy enrichment.

BACKGROUND OF THE INVENTION

Taxonomy is the practice and science of classification. A taxonomy is a collection of controlled vocabulary terms organized into a hierarchical structure. Each term in a taxonomy can be in one or more parent/child (broader/narrower) relationships to other terms in the taxonomy. A taxonomy can be created with a particular set of applications in mind. A particular application that is based on a particular taxonomy can potentially be enriched by using other taxonomies. Integration of two or more taxonomies into a single taxonomy, however, is a challenge, largely because the perspectives of the individual taxonomies differ and a larger vocabulary is needed to reconcile very different taxonomies merging, which may create a lot of gaps, creating a tendency to merge nearly similar taxonomies (a similar taxonomy may often not be available).

SUMMARY OF THE INVENTION

Principles and embodiments of the invention provide techniques for automatic taxonomy enrichment. An exemplary method (which may be computer-implemented) for enriching a taxonomy using one or more additional taxonomies, according to one aspect of the invention, can include steps of receiving two or more taxonomies, wherein the two or more taxonomies comprise a destination taxonomy and one or more additional taxonomies, determining one or more relevant portions of the two or more taxonomies by identifying one or more common terms between the two or more taxonomies, importing one or more relevant portions from the one or more additional taxonomies into the destination taxonomy, and using the one or more imported taxonomy portions to enrich the destination taxonomy.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a merge-into algorithm, according to an embodiment of the invention;

FIG. 2 is a diagram illustrating conflicting taxonomy matches, according to an embodiment of the present invention;

FIG. 4 is a diagram illustrating an exemplary embodiment of the present invention;

DETAILED DESCRIPTION

Figure 3:
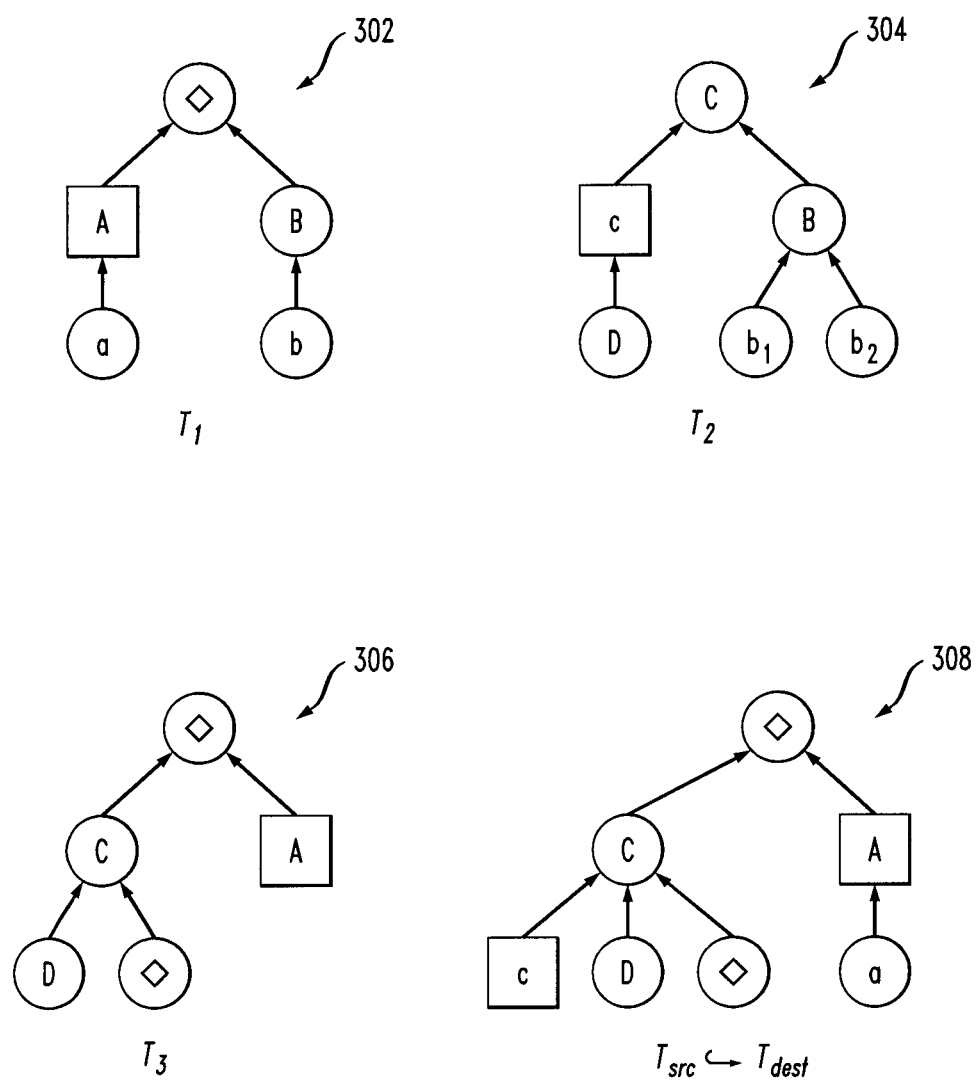
FIG. 3 is a diagram illustrating a three-way enrichment, according to an embodiment of the present invention.

Principles of the invention include automatic asymmetric taxonomy enrichment. In one or more embodiments of the invention, assuming that an application has a single driving taxonomy, other taxonomies can be used to enrich the driving taxonomy (that is, the destination taxonomy). An asymmetric process can lead to conflict resolution. A single driver (or host) taxonomy is enriched by other taxonomies, and the vocabulary can be largely governed by the vocabulary of the host taxonomy. Additionally, in one or more embodiments of the invention, in the case of conflicts, the host taxonomy controls.

The techniques described herein also include producing gap-free taxonomy enrichment. In cases where there is no need to merge whole taxonomies, portions (for example, relevant portions) from various taxonomies can be imported into the host taxonomy for enrichment. Also, depending on the host taxonomy, the changes that are consistent with the host are allowed, thereby preserving the context of the host taxonomy. One or more embodiments of the invention can also include (automatically) using a simple thesaurus to recognize synonyms between taxonomies.

By way of example, a use case of one or more embodiments of the invention can include the following. Because taxonomies can be created with different intentions (for example, an Association for Computing Machinery (ACM) and a Computer Science (CS) category in dmoz), a global integration is neither warranted nor makes sense. However, one taxonomy can leverage another in an area of common interest while still maintaining its unique perspective.

For example, with ACM and dmoz, integrating ACM and dmoz does not make sense. Even within CS, orthogonal divisions in dmoz are irrelevant to ACM. Each, however, can enrich the other.

In another example, consider Cognitive Assistant that Learns and Organizes (CALO) and suggested upper merged ontology (SUMO). SUMO is very high level, while CALO is deeper and narrower. As such, CALO can enrich SUMO, but not vice-versa. Also, for example, consider the Unified Medical Language System (UMLS) and wordnet. UMLS is domain-specific, while wordnet is very general. As such, UMLS can enrich wordnet, but not vice-versa.

FIG. 1 is a diagram illustrating a merge-into algorithm 102, according to an embodiment of the invention. By way of illustration, FIG. 1 depicts an algorithm, as described herein, that enriches the destination taxonomy (Tdest) using another source taxonomy (Tsrc).

FIG. 2 is a diagram illustrating conflicting taxonomy matches, according to an embodiment of the present invention. By way of illustration, FIG. 2 depicts taxonomy $T_{src}$ 202, taxonomy $T_{dest}$ 204 and taxonomy $T_{src} \rightarrow T_{dest}$ 206. As detailed herein, one or more embodiments of the invention use a merge-into algorithm that computes $T_{src} \rightarrow T_{dest}$, where $T_{src}$ and $T_{dest}$ are directed acyclic graph (DAG) taxonomies. A weak dictionary D can help identify synonyms (equivalent terms) between $T_{src}$ and $T_{dest}$. In the most general sense, as described herein, this is a challenge of merging two partial orders, given an equivalence relation between them (matching), and a way to compute this relation (synonym lookup, in this case).

Partial order merging has applications in many settings other than taxonomy merging. By way of example, the following are definitions useful in simplifying the exposition of the algorithm.

Definition 1: The context cxt(v) of a vertex v in a taxonomy is the set of all the ancestors of v, and v∉cxt(v).

Definition 2: The sub-tree sub(v) of a vertex v in a taxonomy is the set of all the descendents of v, and v∉sub(v).

Definition 3: The match list $M=\{m=(u,v) | u \in T_{src}, v \in T_{dest}\}$ contains the synonyms identified across the two taxonomies as ordered pairs. Also, assume that u=syn(v) and v=syn(u). A match (m1, m2) subsumes another match (m3, m4), denoted by (m1, m2)▷ (m3, m4), if $m_1$ is an ancestor of $m_3$ and $m_2$ is an ancestor of $m_4$.

FIG. 3 is a diagram illustrating a three-way enrichment, according to an embodiment of the present invention. By way of illustration, FIG. 3 depicts taxonomy $T_1$ 302, taxonomy $T_2$ 304, taxonomy $T_3$ 306 and taxonomy $T_{src} \rightarrow T_{dest}$ 308. As depicted in FIG. 3, $T_3$ is being enriched by $T_1$ and $T_2$.

As detailed herein, a taxonomy may contain a term at multiple locations. The same term may arise in different "contexts" (for example, context of A is the path from the root to the parent of A). Also, a taxonomy can be a directed acyclic graph (DAG), as well as a tree. Additionally, as detailed herein, if a node A gets more nodes in its sub-tree as a result of the enrichment, it is said that A got refined. Further, changes can occur in the host tree. For example, a leaf may become the root of a sub-tree, a new sub-tree may get added, an intermediate node may get inserted between a parent node and a child node, etc.

One or more embodiments of the invention also include the consideration of invariant properties. For example, if a vertex u is an ancestor of v in a host taxonomy T, then the enrichment should not upset this ordering. As such, no node will get deleted from the host T, and for two identical taxonomies, nothing is altered.

Also, in one or more embodiments of the invention, multiple insertions are supported. By way of example, all unmatched vertices in a sub-tree are inserted, and edges are created only within the sub-tree. Further, the techniques detailed herein include multiple merges and order preservation. For example, the results of D1→(D2→D3) and D2→(D1→D3) will not be unique unless D1∩D2=∅. As used herein, the "→" symbol indicates a merger or enrichment. The results will differ based on the nodes common to D1 and D2.

FIG. 4 is a diagram illustrating an exemplary embodiment of the present invention. By way of illustration, FIG. 4 depicts taxonomy $T_1$ 402, taxonomy $T_2$ 404, taxonomy $T_3$ 406, taxonomy $T_1 \rightarrow (T_2 \rightarrow T_3)$ 408 and taxonomy $T_2 \rightarrow (T_1 \rightarrow T_3)$ 410. As illustrated in FIG. 4, the union of the two solutions is most advantageous in this example. The union of the two solutions indicates the order of enrichment. The first instance 408 indicates that T3 is enriched by T2 and the result is enriched by T1. In the second case 410, T3 is first enriched by T1 and the result is then enriched by T2.

Figures 5, 6:
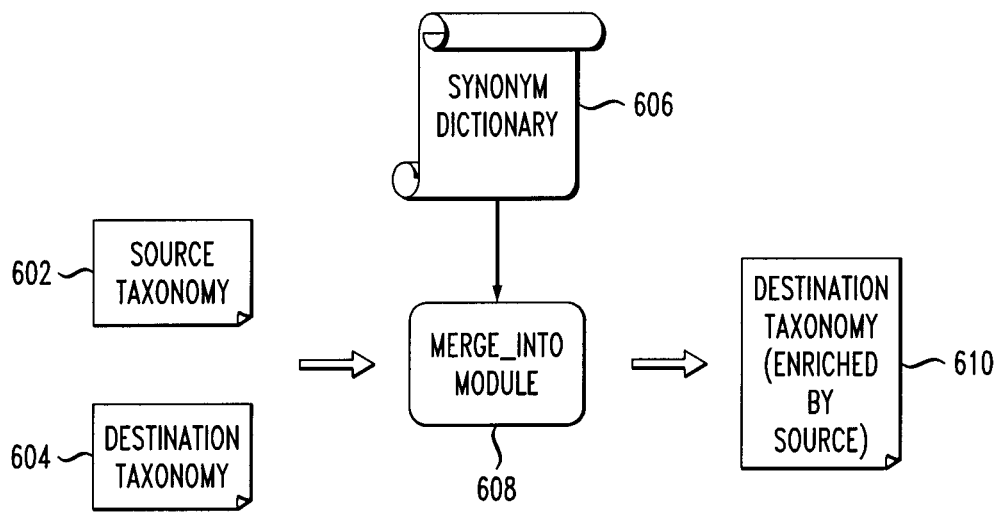
FIG. 5 is a diagram illustrating a multi-merge algorithm, according to an embodiment of the present invention.
FIG. 6 is a block diagram illustrating an exemplary embodiment, according to an aspect of the invention.

FIG. 5 is a diagram illustrating a multi-merge algorithm 502, according to an embodiment of the present invention. By way of illustration, FIG. 5 depicts an algorithm for enriching the destination taxonomy with many taxonomies (not just one).

As detailed herein, one or more embodiments of the invention include multiple merges and order preservation. Sub-tree enrichment can be considered in an order that may be different from the order of the tree enrichment. In the examples depicted in one or more of the figures, there exists a "preferred" solution, wherein sub-tree level enrichment and dependencies among the matches in M are considered.

Additionally, as described herein, one or more embodiments of the invention include asymmetric enrichment as opposed to symmetric merging, as well as algorithms for automatic enrichment, two-way, and multi-way that are conflict-free and efficient.

FIG. 6 is a block diagram illustrating an exemplary embodiment, according to an aspect of the invention. By way of illustration, FIG. 6 depicts source taxonomy 602 (which can include, for example, one or more taxonomies separate from the destination taxonomy), a destination taxonomy 604, a synonym dictionary module 606, a merge-into module 608 and an enriched destination taxonomy 610.

As depicted in FIG. 6, source taxonomy 602 and the destination taxonomy 604 are provided to the merge-into module 608 as input along with input from the synonym dictionary module 606. The merge-into module 608 performs the taxonomy enrichment as detailed herein (for example, as outlined in the steps depicted in FIG. 7) and outputs an enriched destination taxonomy 610.

Figure 7:
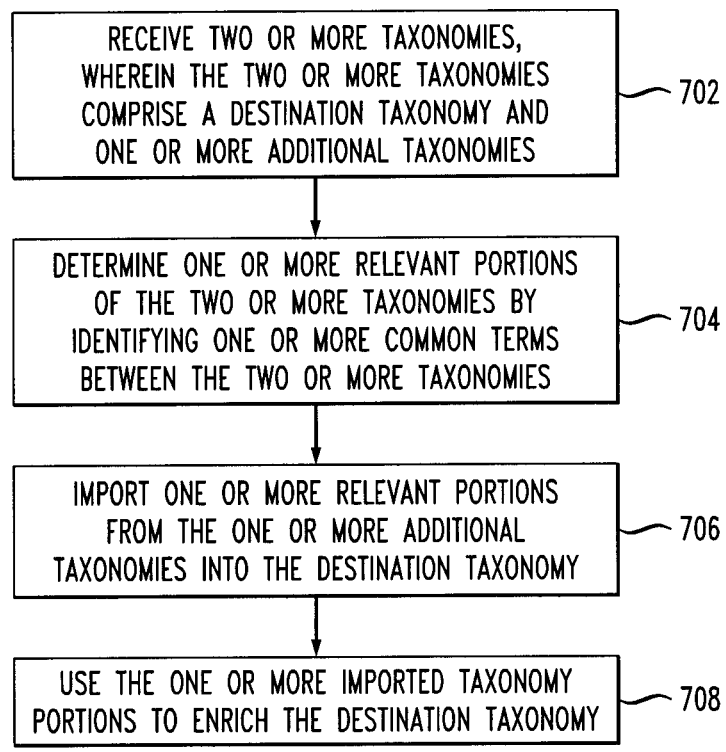
FIG. 7 is a flow diagram illustrating techniques for enriching a taxonomy using one or more additional taxonomies, according to an embodiment of the invention.

FIG. 7 is a flow diagram illustrating techniques for enriching a taxonomy using one or more additional taxonomies, according to an embodiment of the present invention. Step 702 includes receiving two or more taxonomies, wherein the two or more taxonomies comprise a destination taxonomy and one or more additional taxonomies.

Step 704 includes determining one or more relevant portions of the two or more taxonomies by identifying one or more common terms (that is, synonyms) between the two or more taxonomies. Determining relevant portions of the taxonomies by identifying common terms between the taxonomies can include automatically using a thesaurus to recognize the common terms and/or one or more relationships (such as containment or is—a) among the common terms between the two or more taxonomies. By way of example, a weak dictionary can be used to identify synonymous terms in source taxonomies and a destination taxonomy and construct a partial order of synonym pairs. In such a step, one or more vertices of one taxonomy can get mapped to a single vertex in another. The matches can be ordered bottom-up with respect to the destination taxonomy so that the insertions due to subsumed matches have already happened when processing a higher match. Additionally, one or more embodiments of the invention can include checking for conflicts in order to satisfy a condition, wherein a conflict occurs when an ancestor-descendent pair in one taxonomy is matched with a descendent-ancestor pair in the other. In such a case, merging the sub-tree of the descendent in a source taxonomy into the ancestor in the destination taxonomy does not lead to a conflict and is allowed.

Step 706 includes importing one or more relevant portions from the one or more additional taxonomies into the destination taxonomy.

Step 708 includes using the one or more imported taxonomy portions to enrich the destination taxonomy. Using the imported taxonomy portions to enrich the destination taxonomy can include performing asymmetric enrichment. Additionally, using the imported taxonomy portions to enrich the destination taxonomy can include using one or more algorithms for automatic two-way enrichment, wherein automatic two-way enrichment includes accounting for each subsumed and conflicting match and synonym across the two taxonomies. Also, using the imported taxonomy portions to enrich the destination taxonomy can include using one or more algorithms for automatic multi-way enrichment, wherein automatic multi-way enrichment comprises accounting for each subsumed and conflicting match and synonym across three or more taxonomies, and ensuring that an order of one or more merges does not result in information loss.

The techniques depicted in FIG. 7 also include outputting the enriched destination taxonomy. Also, one or more embodiments of the invention can include implementing multiple merges and order preservation. Implementing multiple merges and order preservation can include, for example, consideration of sub-tree enrichment and dependencies among matches. Also, consideration of sub-tree enrichment can include consideration of sub-tree enrichment in an order that is different from an order of tree enrichment.

One or more embodiments of the invention include use of the notion of information losslessness, which is intrinsic in a two-way case. Information losslessness criterion ensures that any vertex that should find its way into the destination is not left out. Under these circumstances, a single perfect order may not exist. However, one or more embodiments of the invention preserve the information losslessness property by performing a multi-way enrichment in an order-free manner.

The techniques depicted in FIG. 7 can also, as described herein, include providing a system, wherein the system includes distinct software modules, each of the distinct software modules being embodied on a tangible computer-readable recordable storage medium. The distinct software modules can include, for example, a synonym dictionary module and a merge-into module executing on a hardware processor.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
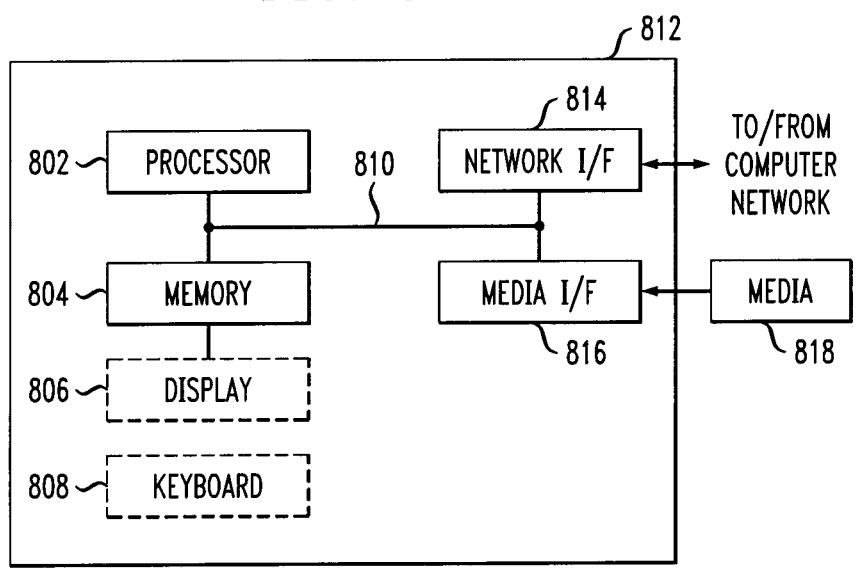
FIG. 8 is a system diagram of an exemplary computer system on which at least one embodiment of the invention can be implemented.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or implementing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 6. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, producing gap-free taxonomy enrichment by importing relevant portions from various taxonomies into a host taxonomy.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for enriching a taxonomy using one or more additional taxonomies, wherein the method comprises:
   receiving two or more taxonomies, wherein the two or more taxonomies comprise a destination taxonomy and one or more additional taxonomies;
   determining one or more relevant portions of the two or more taxonomies by identifying one or more common terms between the two or more taxonomies, regardless of taxonomy intention, wherein said determining comprises:
      implementing a thesaurus to automatically recognize the one or more common terms and one or more relationships among the one or more common terms between the two or more taxonomies; and
      creating an order of the one or more common terms, wherein said order comprises a bottom-up order with respect to the destination taxonomy;
   importing the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and
   using the one or more imported taxonomy portions to perform asymmetric enrichment of the destination taxonomy by using one or more algorithms for automatic two-way enrichment, wherein said automatic two-way enrichment comprises accounting for each subsumed and conflicting match and synonym across the two taxonomies.

2. The method of claim 1, further comprising outputting the enriched destination taxonomy.

3. The method of claim 1, further comprising providing a system, wherein the system comprises one or more distinct software modules, each of the one or more distinct software modules being embodied on a tangible computer-readable recordable storage medium, and wherein the one or more distinct software modules comprise a synonym dictionary module and a merge-into module executing on a hardware processor.

4. A computer program product comprising a non-transitory memory device including computer useable program code for enriching a taxonomy using one or more additional taxonomies, the computer program product including:
   computer useable program code for receiving two or more taxonomies, wherein the two or more taxonomies comprise a destination taxonomy and one or more additional taxonomies;
   computer useable program code for determining one or more relevant portions of the two or more taxonomies by identifying one or more common terms between the two or more taxonomies, regardless of taxonomy intention, wherein said determining comprises:
      implementing a thesaurus to automatically recognize the one or more common terms and one or more relationships among the one or more common terms between the two or more taxonomies; and
      creating an order of the one or more common terms, wherein said order comprises a bottom-up order with respect to the destination taxonomy;
   computer useable program code for importing the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and
   computer useable program code for using the one or more imported taxonomy portions to perform asymmetric enrichment of the destination taxonomy by using one or more algorithms for automatic two-way enrichment, wherein said automatic two-way enrichment comprises accounting for each subsumed and conflicting match and synonym across the two taxonomies.

5. The computer program product of claim 4, wherein the computer useable program code comprises one or more distinct software modules, and wherein the one or more distinct software modules comprise a synonym dictionary module and a merge-into module executing on a hardware processor.

6. A system for enriching a taxonomy using one or more additional taxonomies, comprising:
   a memory; and
   at least one processor coupled to the memory and operative to:

receive two or more taxonomies, wherein the two or more taxonomies comprise a destination taxonomy and one or more additional taxonomies;

determine one or more relevant portions of the two or more taxonomies by identifying one or more common terms between the two or more taxonomies, regardless of taxonomy intention, wherein said determining comprises:

implementing a thesaurus to automatically recognize the one or more common terms and one or more relationships among the one or more common terms between the two or more taxonomies; and creating an order of the one or more common terms, wherein said order comprises a bottom-up order with respect to the destination taxonomy;

import the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and use the one or more imported taxonomy portions to perform asymmetric enrichment of the destination taxonomy by using one or more algorithms for automatic two-way enrichment, wherein said automatic two-way enrichment comprises accounting for each subsumed and conflicting match and synonym across the two taxonomies.

7. The system of claim 6, further comprising a tangible computer-readable recordable storage medium having one or more distinct software modules embodied thereon, the one or more distinct software modules comprise a synonym dictionary module and a merge-into module executing on a hardware processor.

8. A method for enriching a taxonomy using one or more additional taxonomies, wherein the method comprises:

receiving two or more taxonomies, wherein the two or more taxonomies comprise a destination taxonomy and one or more additional taxonomies;

determining one or more relevant portions of the two or more taxonomies by identifying one or more common terms between the two or more taxonomies, regardless of taxonomy intention, wherein said determining comprises:

implementing a thesaurus to automatically recognize the one or more common terms and one or more relationships among the one or more common terms between the two or more taxonomies; and creating an order of the one or more common terms, wherein said order comprises a bottom-up order with respect to the destination taxonomy;

importing the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and using the one or more imported taxonomy portions to perform asymmetric enrichment of the destination taxonomy by using one or more algorithms for automatic multi-way enrichment, wherein said automatic multi-way enrichment comprises accounting for each subsumed and conflicting match and synonym across three or more taxonomies, and ensuring that an order of one or more merges does not result in information loss.

9. A computer program product comprising a non-transitory memory device including computer useable program code for enriching a taxonomy using one or more additional taxonomies, the computer program product including:

computer useable program code for receiving two or more taxonomies, wherein the two or more taxonomies comprise a destination taxonomy and one or more additional taxonomies;

computer useable program code for determining one or more relevant portions of the two or more taxonomies by identifying one or more common terms between the two or more taxonomies, regardless of taxonomy intention, wherein said determining comprises:

implementing a thesaurus to automatically recognize the one or more common terms and one or more relationships among the one or more common terms between the two or more taxonomies; and creating an order of the one or more common terms, wherein said order comprises a bottom-up order with respect to the destination taxonomy;

computer useable program code for importing the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and computer useable program code for using the one or more imported taxonomy portions to perform asymmetric enrichment of the destination taxonomy by using one or more algorithms for automatic multi-way enrichment, wherein said automatic multi-way enrichment comprises accounting for each subsumed and conflicting match and synonym across three or more taxonomies, and ensuring that an order of one or more merges does not result in information loss.

10. A system for enriching a taxonomy using one or more additional taxonomies, comprising:

a memory; and at least one processor coupled to the memory and operative to:

receive two or more taxonomies, wherein the two or more taxonomies comprise a destination taxonomy and one or more additional taxonomies;

determine one or more relevant portions of the two or more taxonomies by identifying one or more common terms between the two or more taxonomies, regardless of taxonomy intention, wherein said determining comprises:

implementing a thesaurus to automatically recognize the one or more common terms and one or more relationships among the one or more common terms between the two or more taxonomies; and creating an order of the one or more common terms, wherein said order comprises a bottom-up order with respect to the destination taxonomy;

import the one or more relevant portions from the one or more additional taxonomies into the destination taxonomy in accordance with said order of the one or more common terms while maintaining the unique perspective of the destination taxonomy via consideration of sub-tree enrichment and dependencies among matches in an order that is different from an order of tree enrichment associated with the destination taxonomy; and use the one or more imported taxonomy portions to perform asymmetric enrichment of the destination taxonomy by using one or more algorithms for automatic multi-way enrichment, wherein said automatic multi-way enrichment comprises accounting for each subsumed and conflicting match and synonym across three or more taxonomies, and ensuring that an order of one or more merges does not result in information loss.

\* \* \* \* \*